Figure 2:
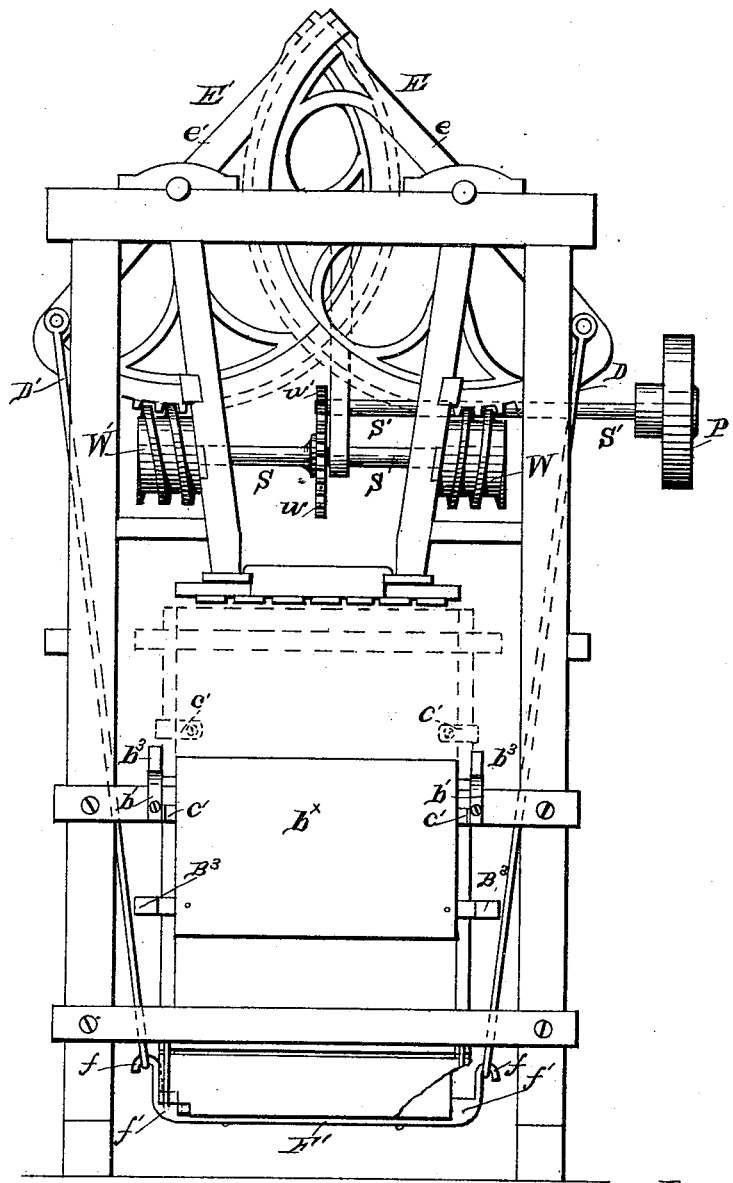

(No Model.) 4 Sheets—Sheet 1.
A. B. FLOWERS.
COTTON PRESS.
No. 353,784. Patented Dec. 7, 1886.
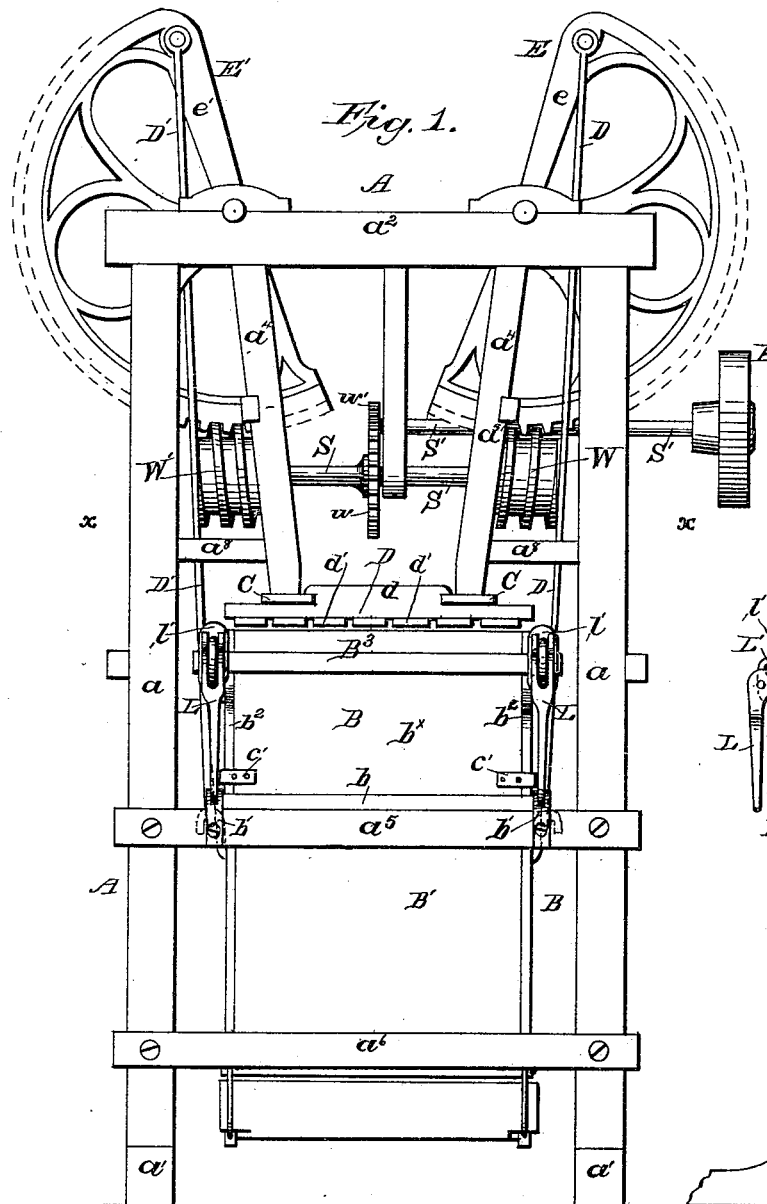
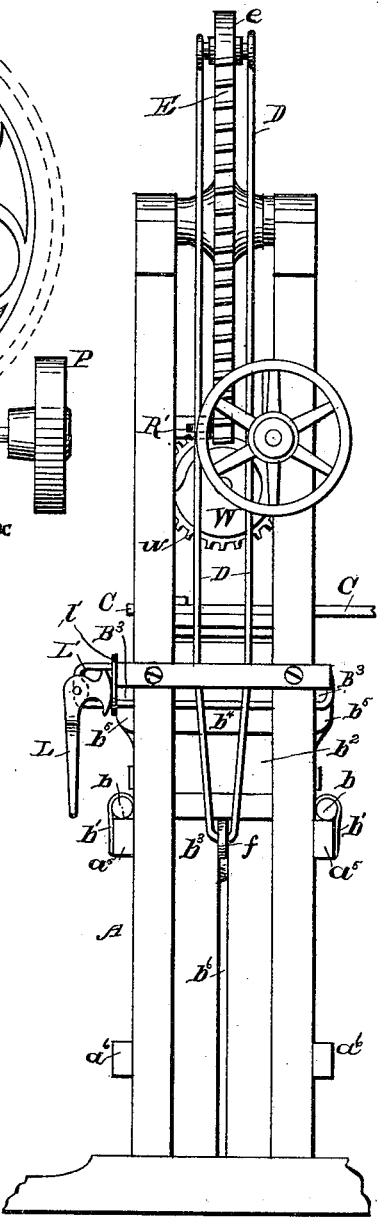
Witnesses
Wm R. Davis
Paul M. Knobloch
Inventor
A B Flowers
Henry Orth
Attorney (No Model.)

4 Sheets—Sheet 2.

A. B. FLOWERS.
COTTON PRESS.

No. 353,784. Patented Dec. 7, 1886.

Witnesses.
Wm R. Davis.
Paul M. Knobloch.

Inventor,
A B Flowers
by Henry Orth
Attorney.

(No Model.) 4 Sheets—Sheet 3.
A. B. FLOWERS.
COTTON PRESS.
No. 353,784. Patented Dec. 7, 1886.
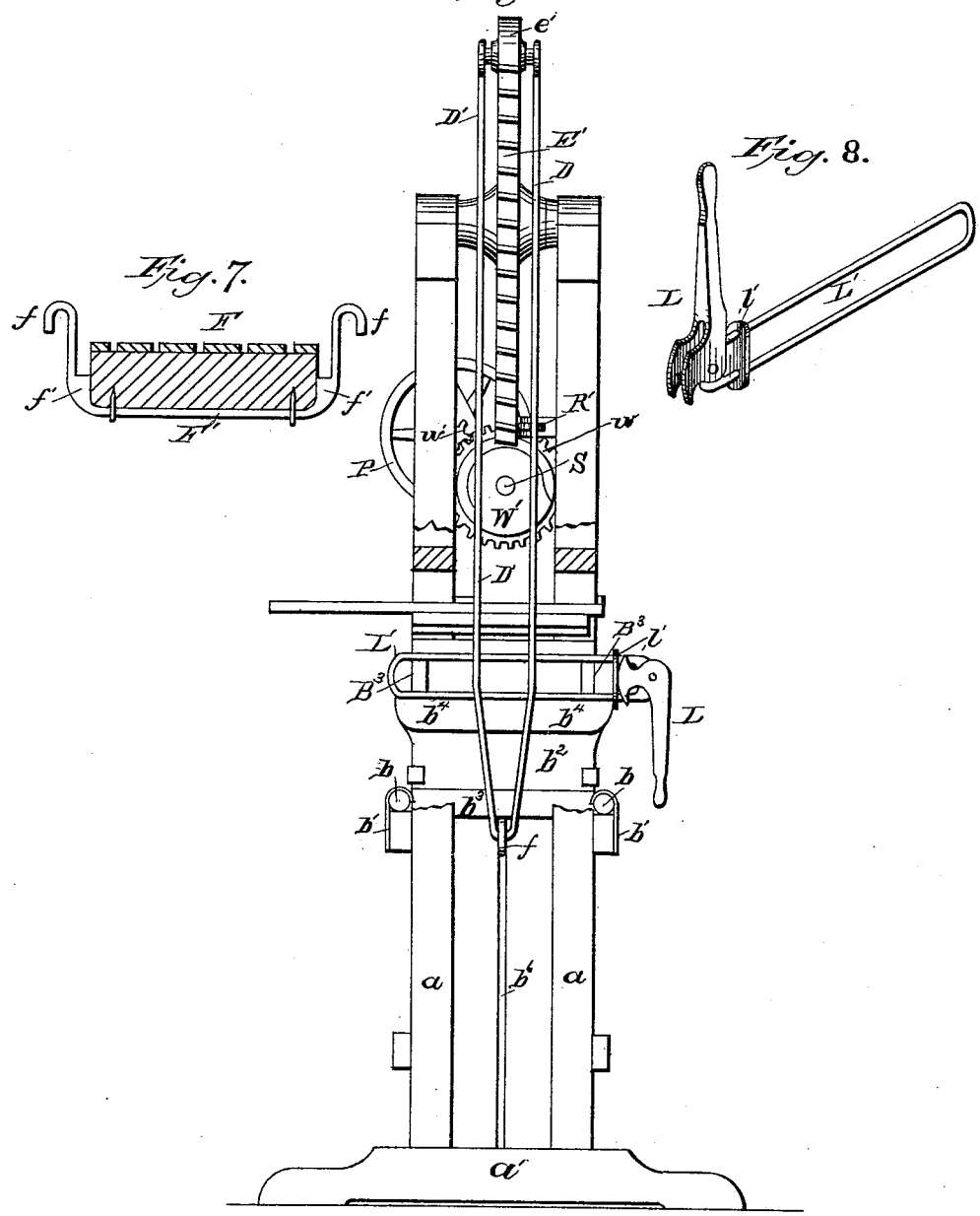
Witnesses.
Wm R. Davis.
Paul M. Knobloch.
Inventor.
A. B. Flowers
by Emery Orth
Attorney.

(No Model.) 4 Sheets—Sheet 4.
A. B. FLOWERS.
COTTON PRESS.
No. 353,784. Patented Dec. 7, 1886.
Fig. 5.
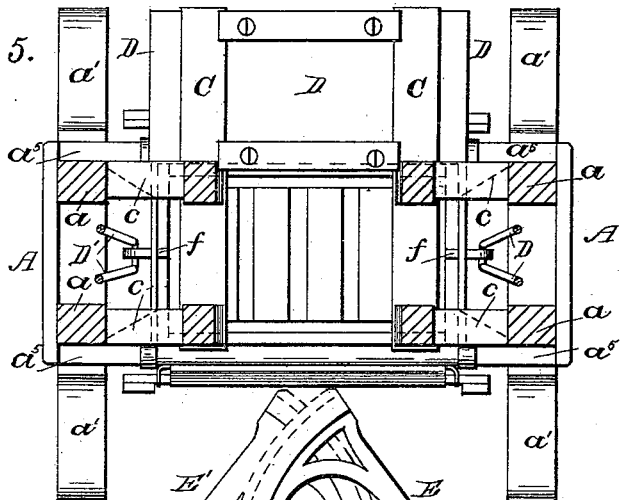
Fig. 6.
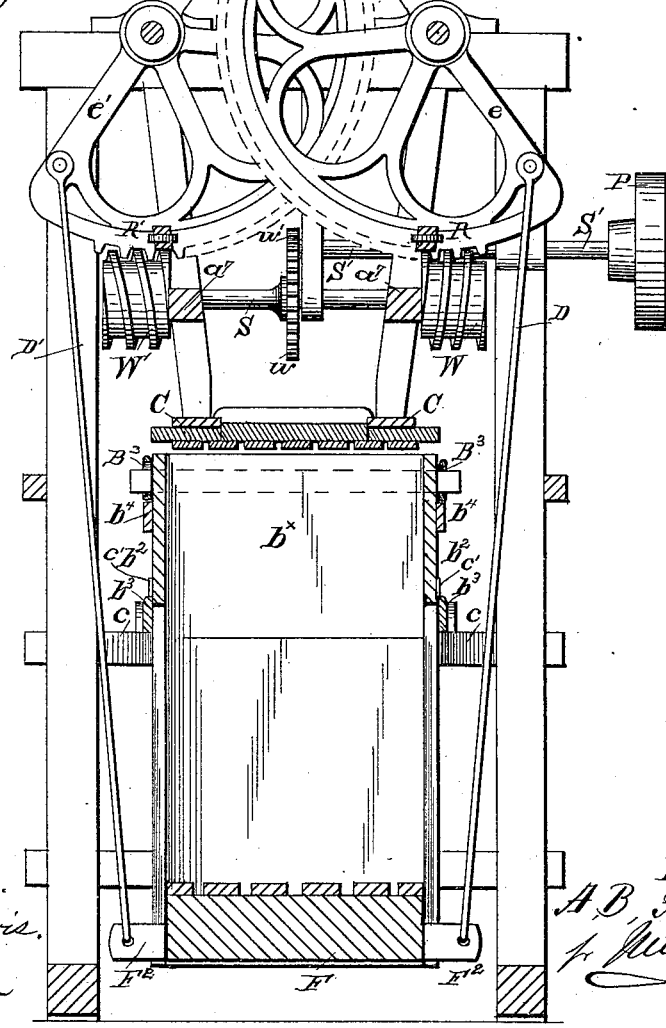
Witnesses.
Wm R. Davis
Carver M Knobloch
Inventor.
A. B. Flowers
Attorney.
N. PETERS, Photo-Lithographer, Washington, D. C.

UNITED STATES PATENT OFFICE.

ANDREW B. FLOWERS, OF MONTGOMERY, ALABAMA.

COTTON-PRESS.

SPECIFICATION forming part of Letters Patent No. 353,784, dated December 7, 1886.

Application filed August 5, 1886. Serial No. 210,117. (No model.)

*To all whom it may concern:*

Be it known that I, ANDREW B. FLOWERS, a citizen of the United States, residing at Montgomery, in the county of Montgomery and State of Alabama, have invented certain new and useful Improvements in Cotton-Presses; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

Referring to the drawings, Figure 1 is a front elevation of a baling-press embodying my invention. Fig. 2 is a like view, showing the ends of the compressing-box removed, the front and side walls thereof swung down, and the top or platen moved out of the way. Figs. 3 and 4 are opposite end elevations, the elevation Fig. 4 being shown partly in section. Fig. 5 is a horizontal section, taken on line $x\ x$ of Fig. 1, showing the compressing-box open, and Fig. 6 is a vertical longitudinal section of the press, showing the compressing-box closed. Fig. 7 is a longitudinal section of the follower, and Fig. 8 an isometric view of one of the locking devices for locking the compressing-box.

This invention relates to that class of baling-presses in which the compressing-box is arranged above the lint or feed box, and in which the follower in its positive movement—that is to say, in its movement to compress the material—moves upwardly into the compressing-box.

The object of my invention is to increase the efficiency and the strength of this class of machines, and to provide a simple and secure means for locking the walls of the compressing-box together.

The invention consists, essentially, in structural features, substantially as hereinafter described, and as set forth in the claims.

In the drawings, A indicates the main frame of the press, which consists of four uprights, $a$, supported from two foot-sills, $a'$, of two top longitudinal girts, $a^2$, and four like girts, $a^5\ a^6$, which latter serve to support the lint and compressing box.

To the upper longitudinal girts, $a^2$, are secured four downwardly-projecting beams, $a^4$, that are braced together in pairs by cross-braces $a^7$ and to the uprights by means of braces $a^3$. To the lower end of these beams are secured sills C C, upon which slides the top or platen D of the compressing-box, said sills extending outward sufficiently far to allow said top to be moved thereon clear of the upper end of the compressing-box, as shown in Fig. 5. This top consists of a bed-plate or platen, D, provided, as usual, with spacing-boards $d'$, and to said platen are secured bearings provided with transverse strips $d\ d$, from which the movable top D is supported, the said strips resting and sliding on the sills C, so that said top may be moved clear of the end of the compressing-box.

That portion of the box above the upper longitudinal girts, $a^5$, constitutes the compressing-box B, and that portion of said box below the said girts $a^5$ constitutes the lint-box B'. The lint-box has vertical slots $b^6$ formed in its ends for the passage of lugs or hooks on the ends of the follower-support, presently to be described. The front and rear walls, $bx$, of the compressing-box B are hinged to the girts $a^5$, the hinge consisting of a bar, $b$, pivoted in straps $b'$, bolted to the girts $a^5$. The end walls, $b^2$, of the compressing-box are removable, and are held in position by two sills or end pieces, $b^3$, Figs. 1, 2, 4, and 6, secured to girts $a^5$, and to brackets or bearing-blocks $c\ c$, (shown in Fig. 6 and in dotted lines in Fig. 5,) projecting from said girts $a^5$. As shown in said figures, these brackets extend from the lint-box to the uprights $a$, and serve also as braces for the end walls of said box. The end walls are further secured in position by means of hooks or catches $c'\ c'$ on the front and rear walls, at a point just above the sills $b^3$. Near their upper edges the end walls, $b^2$, have re-enforcing bars $b^4$, and said end walls are provided with projecting portions $b^5$, near their upper ends, on a line with the re-enforcing cross-bars $b^4$, which, like the projections $b^5$, also project beyond the front and rear walls, $bx$, of the compressing-box and form bearings for the ends of brace and locking bars B$^3$, secured to the front and rear walls, $bx$, near their upper edge. The four walls of the compressing-box are locked in position by means of the following devices, referring more particularly to Fig. 5.

L' indicates an oblong link that fits on the ends of the locking-bars B$^3$, that project from opposite ends of the compressing-box B. On said link slides freely a bearing-plate, $l'$, and to one end of the link is pivoted a slotted eccentric-lever, L. It will be seen that when the lever is in the position shown in said Fig. 3 the link may be readily applied to the ends of the locking-bars B³, and that when so applied and the lever is turned down the eccentric will bear on the plate l', which latter, bearing on the outer face of one of the locking-bars, serves as a resistance, and as said plate is loosely mounted on the link L' the latter will draw the bars B³ together, and through the latter the front and rear walls, bx, of the compressing-box B will be firmly pressed against the end walls thereof. When the lever is fully turned down, it will remain in that position until forcibly moved out of it, and thus the two links—one at each end of the compressing-box—will securely hold the four walls of said box, as will be readily understood.

F is the follower, supported from an angle-bar, F', Fig. 7, secured thereto by means of bolts, staples, or other convenient means. At its bent portions the supporting-bar has enlargements $f'$, whereby the hooked vertical arms $f$ are held at the proper distance from the follower, the hooked ends projecting through the vertical slots $b'$ in the ends of the lint-box B'. The follower is hooked to the lower ends of links or stirrups D D', the arms of which are pivoted to toothed sectors or segments E E', respectively. These sectors E E' are half-circles, the stirrups being pivoted to radial arms $e$ and $e'$, near their point of intersection of said circles and in the plane of their greatest diameter.

It is obvious that when the sectors E E' are in the position shown in Fig. 1 the press is exerting its greatest power, a gradually-increasing leverage being thus obtained as the links move nearer to the vertical plane of motion of the follower. The sectors are rotated in opposite directions by means of worms W W' on a shaft, S, that has its bearings in the upper end of the frame A, between the beams $a^4 a^4$, and said shaft is rotated by hand or by means of a toothed wheel, $w$, mounted thereon and meshing with a pinion, $w'$, on a counter-shaft, S', that carries at its outer end a pulley, P, driven from any suitable power.

In order to facilitate the movement of the sectors E and E', I provide anti-friction rollers R and R', respectively mounted in suitable bearings secured to the main frame A on opposite sides of said sectors, the rim of which moves between said rollers.

The inner faces of the top D of the compressing-box and the follower may be constructed in any approved manner, and, as is usual in this class of machines, are provided with spacing-strips for the ties to tie the bale.

The operation of the press is as follows: The follower F being at or moved to the lower end of the lint-box B', and the top D of the compressing-box moved out on the sills C, as shown in Fig. 5, the proper amount of material is introduced into the box from the top and the said top D again moved into its proper place to close the upper end of the compressing-box B, as shown in Fig. 6. The shaft S' is now rotated in the proper direction to move the follower F upward, and when said follower has reached the limit of its upward movement the sectors will be in the position shown in Fig. 1, or about in said position. The bale being fully compressed, the eccentric locking-levers L are now swung upward to release the links L', and said links are removed. The front and rear doors may then be swung down on their hinges and the end doors removed, when access may be had to all four sides of the bale, to secure the bagging thereto and tie the bale. The shaft S' will then be rotated in a reverse direction to move the follower F downward a little, to free the bale and permit its removal from the compressing-box, a suitable platform being provided for the purpose of handling the bales and feeding the material to the press.

Having now described my invention, what I claim is—

1. In a baling-press of the class described, the combination, with the follower F, of the supporting bar or strap F', having vertical hooked arms $f$ and the enlargements $f'$, substantially as described, for the purpose specified.

2. The combination, with the compressing-box of a baling-press provided with removable walls, and bearings projecting from the front and rear walls thereof, of a locking device consisting of the link L', carrying the plate l', and the eccentric-lever L, pivoted to one end of the link, substantially as described, for the purpose specified.

3. The combination, with the compressing-box B, having a sliding top, removable end walls, and hinged side walls provided with the catches $c c'$, and locking-bars B³, of a locking device consisting of the link L', carrying the plate l', and the eccentric-lever L, pivoted to one end of said link, substantially as and for the purpose specified.

4. The combination, substantially as described, of the frame F and the downwardly-projecting beams $a^4 a^4$, supported from said frame, and the sills C C, secured to the lower end of said beams, the lint and compressing box B B', and the top or platen D, constructed to slide on the said sills, for the purpose specified.

5. The combination, with the frame F, the longitudinal girts $a^5 a^6$, the brackets $c c$, the depending beams $a^4 a^4$, and the sills C C, secured to the lower end thereof; of the lint and compressing box B B' and its top or platen D, constructed to slide on the sills C C, said parts being constructed substantially as described, for the purpose specified.

In testimony whereof I affix my signature in presence of two witnesses.

ANDREW B. FLOWERS.

Witnesses:
  WILLIAM R. POLK, Jr.,
  STONEWALL J. WARNER.